Patented Jan. 5, 1932

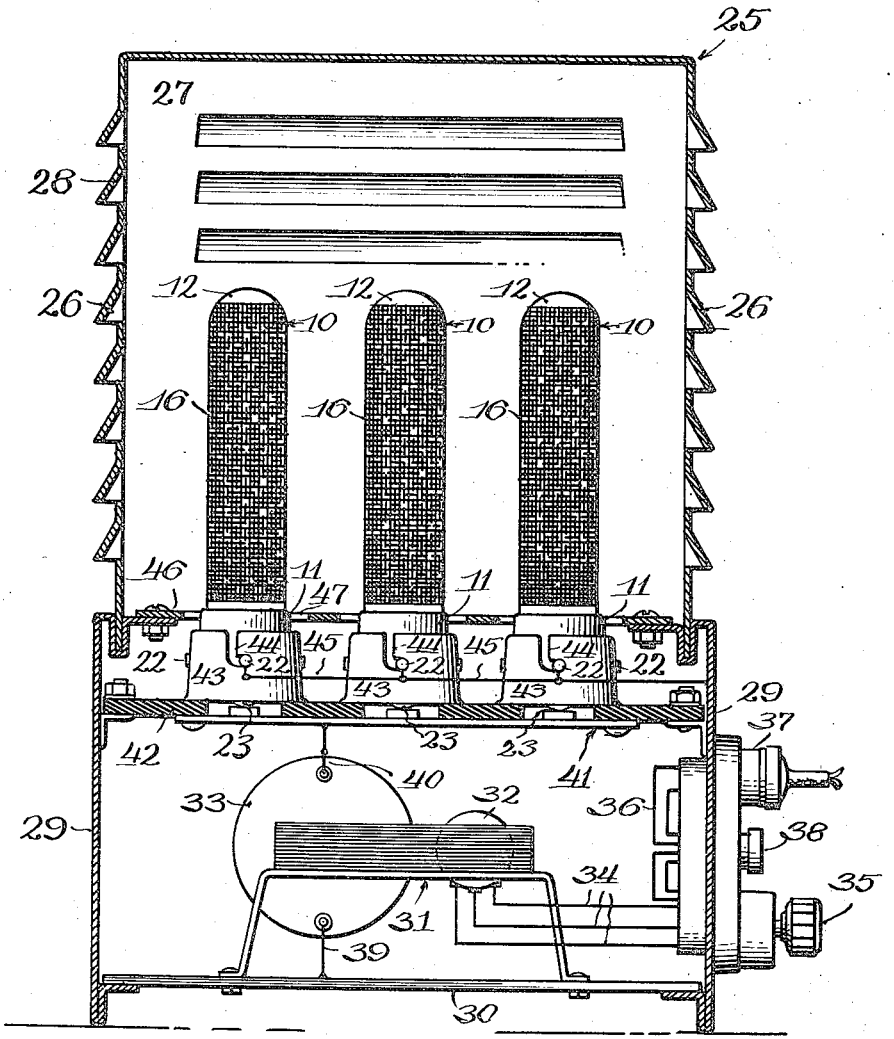

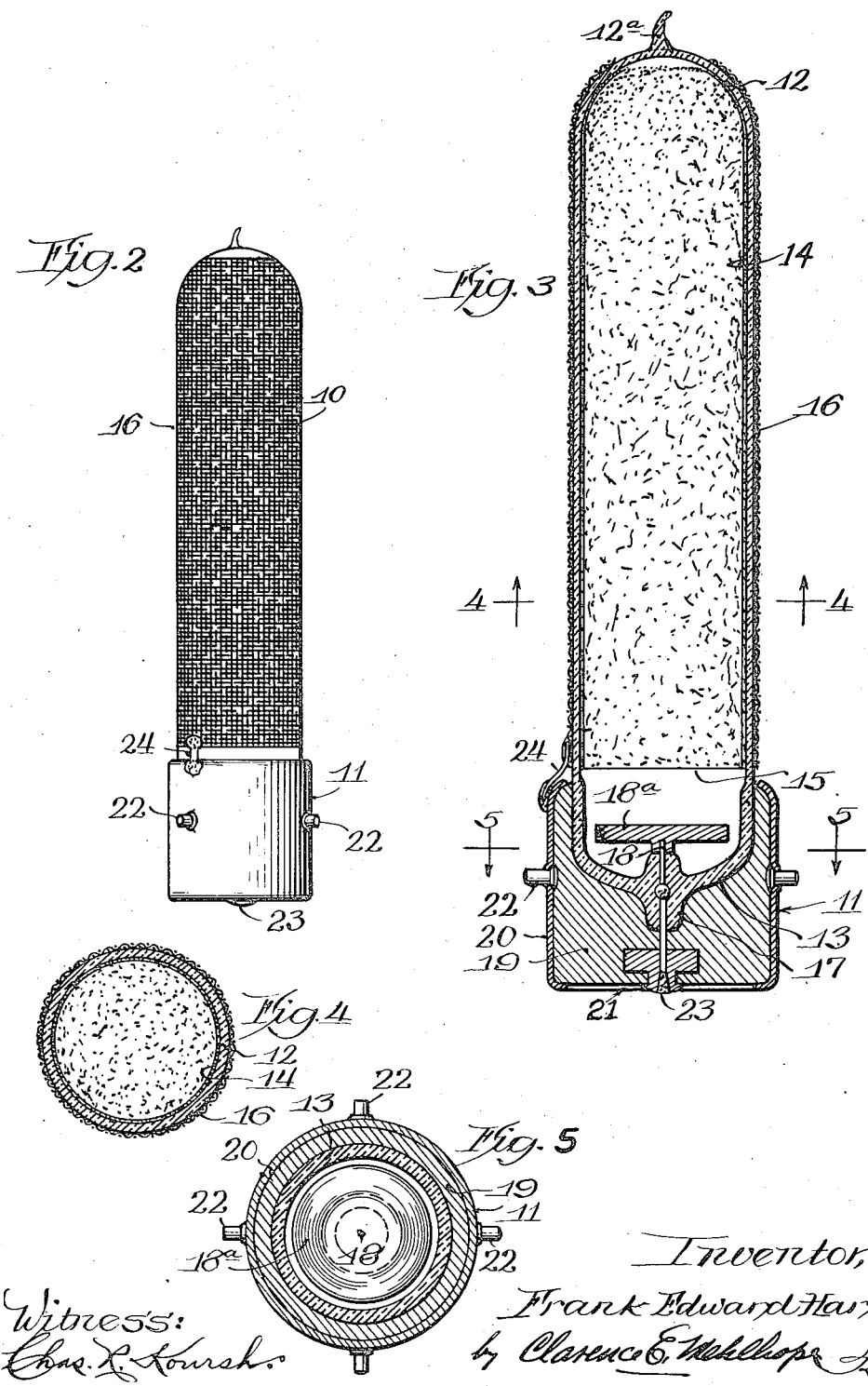

1,839,876

UNITED STATES PATENT OFFICE

FRANK EDWARD HARTMAN, OF EVANSTON, ILLINOIS, ASSIGNOR OF ONE-THIRD TO FRED H. MONTGOMERY, AND ONE-THIRD TO W. RAY MONTGOMERY, BOTH OF CHICAGO, ILLINOIS

APPARATUS OR DEVICE FOR SUPPLYING ARTIFICIALLY IONIZED OXYGEN FOR VENTILATION OR OTHER PURPOSES

Application filed August 2, 1926. Serial No. 126,735.

This invention relates to a novel apparatus or device for supplying artificially ionized oxygen for ventilation or other purposes and consists of the matters hereinafter described and more particularly pointed out in the appended claims.

Ionized oxygen is produced by apparatus now generally employed in the production of ozone and thus to a limited extent has been delivered with the ozone supplied for ventilating purposes. The value of ionized oxygen as an oxidizing agent, however, has not been heretofore recognized and the ionized oxygen produced with ozone and discharged through ventilators has been grounded and deionized long before its escape from the ventilator, in its passage through the metal conduits or ducts connecting the ozone machine with the outlet of the ventilator.

The location of the ionizing apparatus or device with respect to the point of air consumption is of prime importance. This is, first, because the life of an ion is very short, said life being measured by seconds; and, second, because it obviates prolonged contact with the grounded contact surfaces of conduits or ducts, which completely destroys ionization.

I have found by experiment that the great amount of oxidation produced in the presence of ozone, heretofore ascribed to a catalytic action of ozone, has, in fact, been produced by ionized oxygen. Again ionized oxygen has been found to be present in relatively large quantities in outdoor air, which is particularly wholesome and healthful to breathe, whereas such air has contained but a minimum of ozone. Ionized oxygen has the advantage that it is non-odoriferous, whereas ozone is odoriferous and is unpleasant to breathe. It is, therefore, manifestly desirable to deliver with the air used for ventilation purposes ionized oxygen in large quantities, with as little ozone as possible.

The usual type of ozone generator might be used for producing air with a high ratio of ionized oxygen to ozone; but it would require an exceedingly large flow of air through the field of electric discharge; and as the air space of such field does not exceed a few millimeters, the resistance offered to a large air flow makes it necessary to employ high air pressures with resulting high operating costs. Again as moisture in the air results in the formation of nitric acid upon the elements of the generator, it is necessary to dehydrate the air before it is passed through the generator, which adds to the expense of operation.

The object of the present invention is to produce an apparatus or device which will simulate nature and supply for ventilation or other purposes air containing a maximum of ionized oxygen with but a minimum of ozone; which may be operated at a minimum of expense, and which is compact and comparatively small in size, so that it may be used immediately adjacent to the outlet of a ventilator or other point of consumption.

The many advantages of the invention will appear more fully as I proceed with my specification.

In the drawings:

Figure 1 is a view representing a vertical central section through an apparatus or device embodying my improvements and capable of supplying air for ventilation or other purposes containing a maximum of ionized oxygen.

Figure 2 is a view representing a side elevation of one of the ionizing tubes used in the apparatus.

Figure 3 is a view representing on an enlarged scale a vertical central section through the ionizing tube.

Figure 4 is a view representing a cross-section through said tube in a plane indicated by the line 4—4 of Figure 3.

Figure 5 is a view representing a transverse section through the tube in a plane indicated by the line 5—5 of Figure 3.

Referring now to that embodiment of the invention illustrated in the drawings.

My improved ionizing apparatus or device in its preferred form includes a plurality of elongated glass tubes each mounted on an insulated base provided with a ferrule and center contact, to be inserted in a socket connected with electric conductors, somewhat in the manner of the usual lamp socket. Each tube, as will appear from the following description, is what is familiarly known as a valve tube. 10 indicates said glass tube and 11 the base in which it is mounted. This tube has a wall of substantially uniform cross-section and is rounded at its top and bottom ends as indicated, respectively, at 12 and 13 (see Fig. 3). The inner surface of the tube is preferably (though not necessarily) provided with a metallic lining 14 which extends about the top end 12 and down towards the bottom end to cover substantially the greater part of the length of the inner surface of the tube. The said metallic lining makes a lower vacuum in the tube possible. The metallic lining 14 may be produced in any convenient way, as for example by applying the metal in a finely divided form mixed with a suitable adhesive, by means of a brush. Any other means may be used which will produce a close adherence of the metal to the glass. The bottom end of this metal lining is indicated in the drawings at 15.

The outer surface of the tube is covered down to the level of the bottom end 15 of the metal coating 14 by a perforated metal envelope,—in this case a wire mesh or gauze 16. The glass wall of the tube provides a dielectric between the wire mesh 16 on the outside of the glass wall of the tube 10 and the metal lining 14 on the inside of said wall.

After the wire mesh and the metal lining have been applied to the tube it is exhausted by connecting it to a vacuum pump of the mercury or other suitable type, by means of which it is evacuated to a high degree of vacuum. It is then sealed off at its top end as indicated at 12—a, said top end of the tube having been left open to permit the application of the inner metallic lining 14. Before sealing off the bottom end of the tube, a wire 18 is inserted thereinto and an electrode 18ª of comparatively large area is applied through the bottom end of the tube to the end of said wire.

The base 11 is made of an insulation compound 19. A metallic ferrule 20 embraces the sides and the annular margin of the bottom of said base is indicated at 21. The ferrule 20 is provided with four radial pins 22 arranged at equi-arcuate distances about its periphery and is electrically connected by a wire 24 to the wire mesh 16. The wire 18 is carried down through the base to a central contact 23. Thus with the base inserted in a suitable socket connected to a suitable source of electric current, the path of the current will be from the wire 18 and electrode 18ª through the vacuum in the tube to the metallic lining 14, thence through the dielectric presented by the glass wall of the tube, to the wire mesh 16.

25 indicates a casing or shell in which a plurality,—in this case three,—of the tubes 10 are preferably enclosed. (See Fig. 1.) Said casing has upright side and end walls 26, 26, 27, 27, each or all of which are provided with louvre discharge openings 28 for the escape of the ionized oxygen. The casing 25 is supported upon a suitable frame or shell 29, which shell (for a purpose later to appear) is made of aluminum or of some other non-magnetic material. Said base has a bottom wall 30.

31 indicates a step-up transformer, preferably of the high reactance type, and 32 and 33 indicate, respectively, its primary or low tension coil and its secondary or high tension coil. Said transformer is suitably supported on the bottom wall 30 of the base shell or frame 29. 34 indicates a plurality of taps taken off at different points along the winding of the primary coil 32 so as to vary the turn ratio and the resulting potential set up in the secondary winding 33. Said taps are connected with a multiple switch 35, which is in circuit with electric conductors 36 led into the frame 29 through an extension plug 37 fitted to the upright side wall of the said frame in any convenient manner. 38 indicates fuses interposed in the conductors 36 between the plug 37 and the switch 35. One terminal of the secondary winding 33 is grounded by a wire 39 on the bottom wall 30 of the base. The other terminal is connected by a wire 40 to a bus-bar 41.

42 indicates an insulation shelf fixed in the frame 29 above the transformer 31. On said shelf are fixed a plurality of insulation socket bases 43,—one for each tube 10. Said bases are provided with bayonet slots 44 to receive the pins 22 on the ferrules 20 of the tubes, so as to lock said tubes in the bases 43 by a slight turn of the same. A wire 45 connects the pins 22 to the side wall of the frame 29 so as to ground said pins. The center contacts 23 of the tubes 10, on the other hand, contact with the bus-bar 41. A second insulation shelf 46 provides a top for the frame 29, said shelf having apertures 47 through which the tubes may be inserted when applying them to the bases 43.

The operation of the apparatus is as follows: When the transformer 31 is energized, a potential of 5,000 to 10,000 volts is set up in the secondary and delivered by the bus-bar 41 to the contacts 23 of the several ionizing tubes 10. The outer mesh electrode 16 of each of the tubes 10 is connected through its ferrule 20, pins 22 and the wire 45 to the frame 29 or ground and thus to the other side of the secondary coil, which is grounded on said frame by the wire 39.

Electrons flow from the electrode 18ª in the bottom of the tube 10 across the vacuum space separating it from the inner metallic lining 14 of the tube and are collected thereon. From thence they flow through the glass dielectric, namely, the wall of the tube 10. The metallic lining 14 reduces the electrical resistance to the passage of the electrons. A discharge is thus set up between the inner metallic lining 14 and the wires of the wire mesh electrode 16 which manifests itself as a corona discharge. This discharge is active in ionizing oxygen and produces some ozone. In addition, however, many electrons passing from the inner vacuum space are not collected by the wire mesh 16, but pass through the interstices therein and are shot off as migrating electrons into space, where they collide with oxygen molecules and ionize them.

The gross electric potential impressed across the electrodes of the tubes 10 should be sufficient to yield an effective potential of such magnitude as to give to the migrating electrons sufficient kinetic energy to permit them readily to ionize oxygen, without causing such drastic molecular rearrangements as to induce an excessive formation of ozone. This effective potential is best determined through ascertaining, by experiment, the ionizing to ozone-forming ratio and regulating the gross potential accordingly. The gross potential required is determined by the resistance of the secondary circuit (thickness of the glass tube, degree of vacuum, etc.) plus the effective potential.

The advantages of my improved apparatus in the production of ionized oxygen over the ordinary apparatus specifically designed for ozone production lies in the fact that the two electrodes are not separated by a gaseous dielectric nor so arranged that a deposition of vapors or solids existing in the air may occur. On the contrary, there is at all time a so called electric breeze emanating from the tube in the escape of electrons into space, which will actually dislodge such dust or vapor as may have settled or condensed on the tube when not energized, and positively prevent such settlement, condensation or deposition when in operation. This eliminates the necessity for using only clean, dry air. And as there is a complete absence of sparking discharges, no oxides of nitrogen are formed.

Since the outer electrode 16 is grounded through the frame 29 it can be touched while in operation without imparting an electric shock. In addition, should a tube be broken by accident or by failure under electric stress, the vacuum is immediately destroyed and the circuit immediately opened. Hence the operation of these tubes is at all times safe.

I claim as my invention:

1. In an apparatus for producing ionized oxygen, an evacuated glass valve tube, an electrode of large area within one end of said tube adapted for connection to a source of electricity without said tube but having no other contact with said tube, and a perforate metal envelope on the outside of said tube, with substantially no air gap between providing the other electrode.

2. In an apparatus for producing ionized oxygen, an evacuated glass valve tube, an electrode within one end of said tube adapted for connection to a source of electricity without said tube, a metallic coating on the inside of said tube having no metallic connection with said electrode, and a perforate metal envelope on the outside of said tube, with substantially no air gap between providing the other electrode.

3. An external discharge tube comprising a glass envelope, an inner electrode of large area at one end of said tube and a perforated metal envelope on the outside of said tube with substantially no air gap between constituting the other electrode.

In testimony that I claim the foregoing as my invention, I affix my signature this 29th day of July, A. D. 1926.

FRANK EDWARD HARTMAN.